June 2, 1970     W. F. DEETER ET AL     3,515,108
VAPOR RECOVERY SYSTEM
Filed Dec. 2, 1968     2 Sheets-Sheet 1
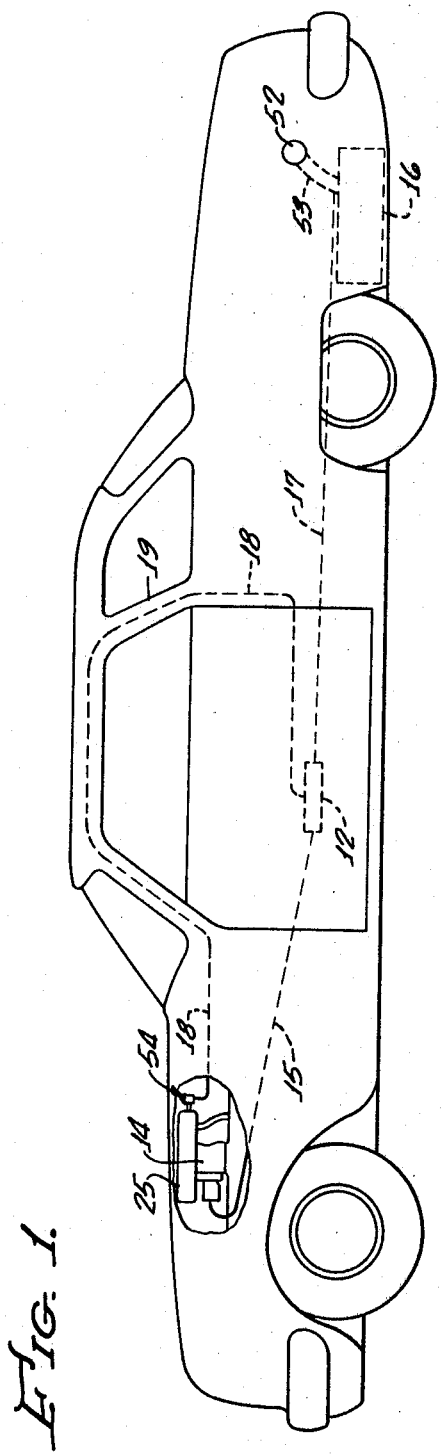
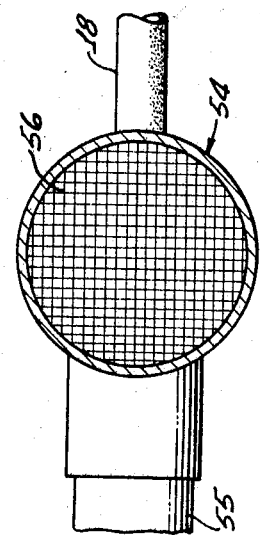
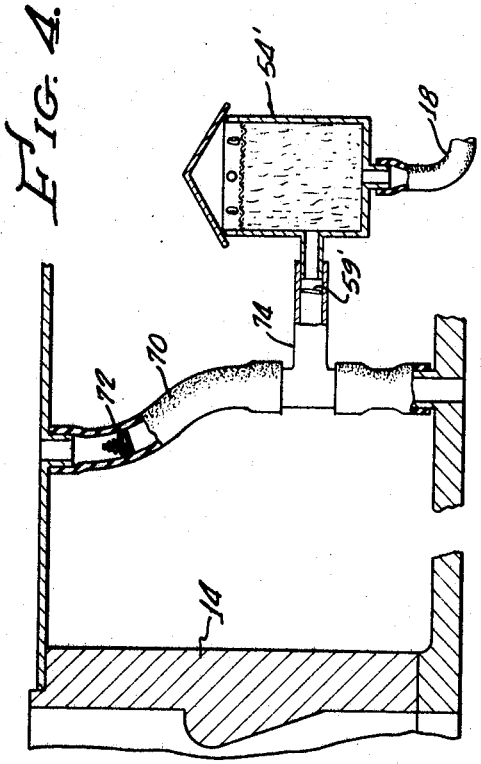
INVENTORS.
HAROLD D. DAIGH
WENDELL F. DEETER
BY David L. Reisdorf
ATTORNEY.

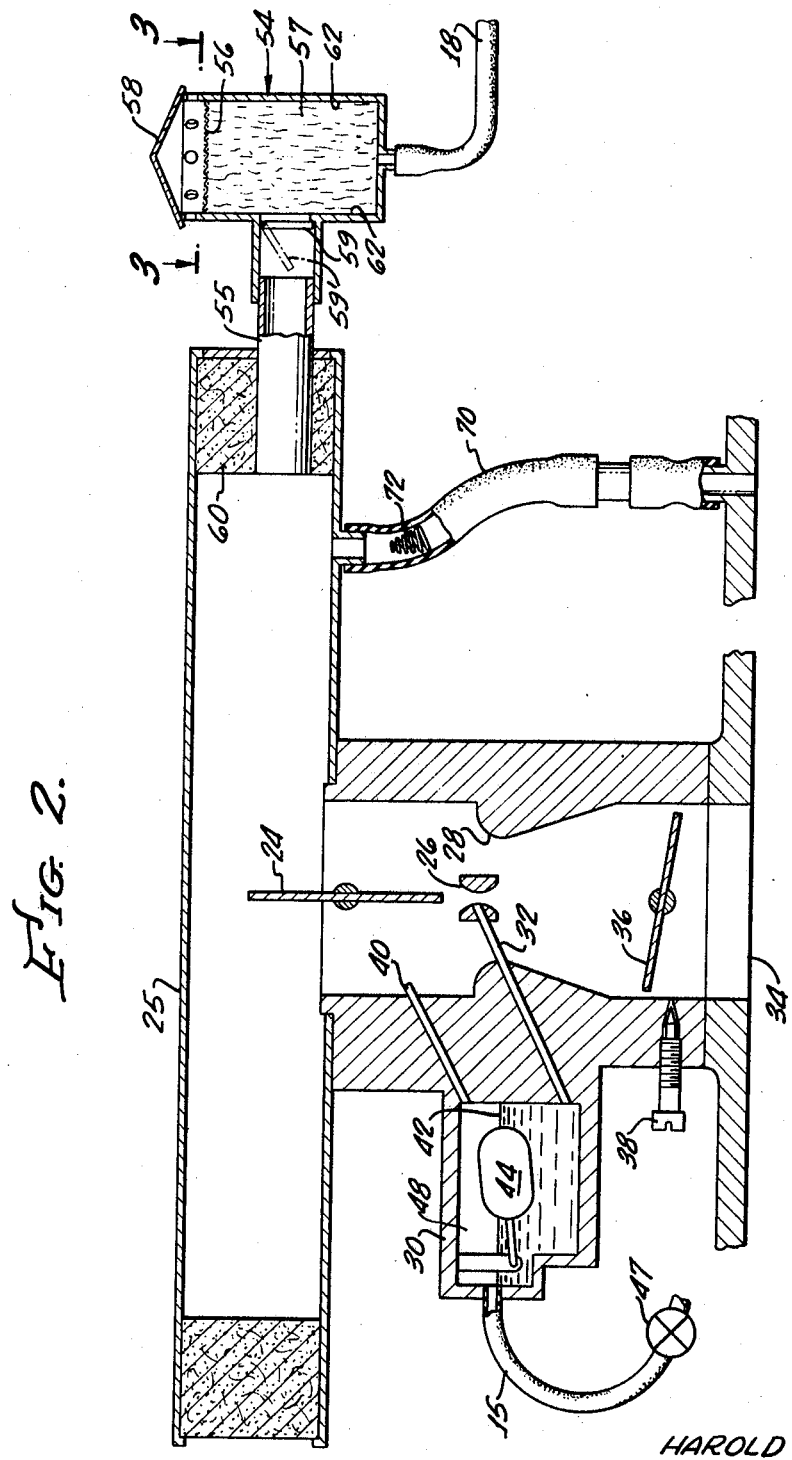

United States Patent Office 3,515,108
Patented June 2, 1970

3,515,108
VAPOR RECOVERY SYSTEM
Wendell F. Deeter, Los Alamitos, and Harold D. Daigh, Rolling Hills Estate, Calif., assignors to Atlantic Richfield Company, Philadelphia, Pa., a corporation of Pennsylvania
Continuation-in-part of application Ser. No. 650,436, June 30, 1967. This application Dec. 2, 1968, Ser. No. 780,464
Int. Cl. F02m 57/04; B01d 50/00
U.S. Cl. 123—136   4 Claims

ABSTRACT OF THE DISCLOSURE

This application discloses a system for reducing evaporative emissions from the fuel system of an internal combustion engine driven vehicle, comprising a vent system fluidly connecting the carburetor float chamber and fuel tank of the vehicle with a condenser receptacle disposed therein for condensing and returning condensed evaporative emissions to the fuel tank. The top portion of the condenser is vented to an adsorbent material mounted in the system for adsorbing uncondensed hydrocarbons. Fresh air is drawn through the adsorbent material during the operation of the vehicle above a predetermined level of delivered power to desorb adsorbed hydrocarbons therefrom. The system is designed to condense a portion of the evaporative hydrocarbon emissions from the carburetor and fuel tank and return them to the fuel tank. Primary hydrocarbon vapor control and adsorption is accomplished during periods of soak, i.e., when the engine is not running and evaporative emission losses are highest and primary desorption is accomplished during periods of engine operation. The desorption is limited to predetermined levels of delivered power so that the carburetor air-fuel ratio in the induction system is not adversely affected and so that hydrocarbon and carbon monoxide exhaust emissions are not harmfully increased by induction of the desorbed hydrocarbons into the engine.

---

This application is a continuation-in-part application of our application S.N. 650,436, filed June 30, 1967, now abandoned.

RELATED APPLICATIONS

Application Ser. No. 715,811, filed Mar. 25, 1968 for "Vehicle Vapor Recovery System" by Harold D. Daigh.

BACKGROUND OF INVENTION

Much attention has been given in the past to the control of air pollution by the prevention of automotive fumes from escaping into the atmosphere. Blowby or crankcase fumes are controlled by recycling into the induction system and several proposals have been made for the prevention of air pollution by engine exhaust products. Among these proposals are air injection systems which inject air into the exhaust manifold to support combustion of unburned hydrocarbons and carbon monoxide in the exhaust gas leaving the engine and exhaust recycle systems for recycling the combustion products into the induction system, as for example, the system shown in Pat. No. 3,237,615 to Harold D. Daigh, dated Mar. 1, 1966.

Another source of air pollution not affected by the above-mentioned air pollution control systems, is the fuel lost to the atmosphere by evaporation in the carburetor, the fuel tank, and passage through the various fuel system vents incorporated as standard equipment on automobiles. The light hydrocarbons in the fuel evaporating from the carburetor in part escape into the atmosphere through internal carburetor vents and the air cleaner. The vapors from the fuel tank normally escape through the tank vents or the fuel tank cap.

This invention is an improvement over the disclosure of application Ser. No. 715,811, filed Mar. 25, 1968, now U.S. Pat. No. 3,448,731 dated June 10, 1969 for "Vehicle Vapor Recovery System," by Harold D. Daigh. That apparatus uses a condenser for condensing and a carbon trap for adsorbing excess uncondensed light hydrocarbon gases from the vapors passing therethrough, since under certain conditions such as long standing under relatively high temperature, unusually high evaporative emission of hydrocarbons are generated from the fuel tank and carburetor. If these excessive hydrocarbon vapor emissions are not retained during soak and properly disposed of during operation they may be unburned and released into the atmosphere either directly or through the exhaust system or may be only partially combusted and released into the atmosphere as increased carbon monoxide emissions. The adsorbed excess hydrocarbons must be desorbed from the carbon trap particle's adsorbent surfaces to maintain the trap in an unsaturated condition. This is accomplished by passing relatively hydrocarbon-free gases through the trap. These gases cleanse the adsorbent particles by desorbing the hydrocarbons therefrom and carry the desorbed hydrocarbons into the induction system of the engine.

Each engine is set to operate at an optimum air to fuel ratio maintained by its carburetor. Thus, intake of desorbed hydrocarbons and air into the induction system in relatively large quantities compared to flow through the carburetor disrupts the air to fuel ratio in the engine and causes the poor operating characteristics sometimes observed for engines using vapor recycle systems. Prior evaporative recovery systems having adsorbent media therein which use fresh air to desorb hydrocarbons have been particularly unsatisfactory during idle and at low speed operation of the vehicle since the air-fuel intake from the carburetor under these conditions is of relatively low volume. Thus, at idle and low speeds, the air-fuel ratio in the induction system is greatly influenced by the intakes of even small amounts of air and desorbed hydrocarbons through the adsorbing media and the air-fuel ratio is usually adversely affected under these conditions with the prior devices which may result in poor operating characteristics and increased exhaust emissions.

SUMMARY OF INVENTION

This invention is directed to a system for use on four cycle internal combustion engine driven vehicles for controlling evaporative emissions from the carburetors and fuel tanks thereof. The system includes a condenser receptacle in which the vapors are partially condensed and the condensate returned to the fuel tank. The vapors containing uncondensed hydrocarbons are directed into a carbon trap where the hydrocarbons are removed before emission into the atmosphere. In particular, this improvement is directed to the carbon trap arrangement in such a vapor control system so that hydrocarbons are adsorbed on the trap during periods of highest hydrocarbon vapor emissions and are desorbed during periods of low vapor emissions after the engine has developed a predetermined power. The predetermined power is selected so that the desorbed hydrocarbon vapors are inducted into the engine in relatively small quantities compared to the normal air-fuel intake through the carburetor. The carbon trap is disposed in the system adjacent to an air cleaner and is in fluid communication with a valve set to open for permitting fresh air to be drawn by the induction system of the engine through the trap during operation of the engine above the predetermined power. The valve is closed during periods of soak, during engine idle and at slow operating speeds, for example, on most passenger vehicles at speeds less than 30–50 m.p.h.

An object of this invention is to provide an improved vapor recovery system for internal combustion engine driven vehicles which reduces hydrocarbon emissions to the atmosphere and does not adversely affect operating characteristics of the engine at idle and low speeds.

One object of this invention is to provide a hydrocarbon evaporative emission control system including the adsorbent media for reducing hydrocarbon vapor emissions into the atmosphere from internal combustion engine driven vehicles during soak, said system including means for desorbing said media with fresh air during operation of the vehicle and for directing the air-desorbed hydrocarbon mixture into the engine induction system in relatively small amounts as compared to the air-fuel mixture inducted through the vehicle carburetor.

Another object of this invention is to provide a system for use in internal combustion engine driven vehicles for transporting evaporative emissions from the carburetor float chamber and the fuel tank into the induction system of the engine through a hydrocarbon vapor adsorbent media which is desorbed during operation of the engine above a predetermined level of delivered power.

Yet another object of this invention is to provide an internal combustion engine driven vehicle vapor recovery system having a condenser and an adsorbing media for removing uncondensed hydrocarbons from the vapors passing therethrough said system including means for desorbing hydrocarbons from said media when the vehicle is operated above a predetermined speed and/or above a predetermined acceleration rate.

FIG. 1 shows, partially in section, an automobile having installed thereon the apparatus of this invention;

FIG. 2 shows, partially in section, an enlarged view of the carburetor and carbon trap from the cut-away portion of FIG. 1;

FIG. 3 is a plan view of the carbon trap of this invention taken substantially along line 3—3 of FIG. 2; and FIG. 4 is a partially sectioned elevation of another carbon trap arrangement for the system of this invention.

With reference to the drawings generally, this invention may be described briefly as an apparatus for recovering gasoline vapors in a fuel system having all but one of the external vents closed, wherein a condenser receptacle 12 is provided below the carburetor 14 and above the fuel tank 16. Vent lines 15 and 17 are provided between the carburetor and the condenser and between the condenser and the fuel tank, so that the fuel vapors escaping the carburetor and the fuel tank are vented into the condenser 12 where they are partially condensed and the condensate drained back to the fuel tank 16. The condenser 12 itself can be appropriately vented through line 18 as will be described hereinbelow.

The carburetor, shown in enlarged view in FIG. 2, is of conventional type with an air cleaner 25 positioned on top of the throttle body over the choke butterfly valve 24. The carburetor venturi 26 in the carburetor throat 28 receives fuel from the float chamber or bowl 30 through fuel jet 32. The combustion mixture flows into the induction system through the opening 34 and is controlled by the throttle butterfly valve 36. A conventional idle adjustment needle 38 is provided in the throttle body. An internal vent 40 vents the carburetor float chamber internally. The fuel level 42 in float chamber 30 is controlled by a float 44 which permits fuel flow into chamber 30 when the fuel level falls below the desired level. The carburetor vent line 15 is provided externally in float chamber 30 just above the desired fuel level to provide venting and means for removal of vapor and any excess liquid fuel from space 48 in float chamber 30.

A one-way flow or check valve 47 may be provided in line 15 between the carburetor and the condenser to prevent back flow of liquid fuel into the carburetor in the event of parking on a steep slope with the fuel tank elevated higher than the carburetor. For a more detailed discussion of such a valve see Harold D. Daigh application Ser. No. 715,811 for "Vehicle Vapor Recovery System," now U.S. Pat. No. 3,448,731.

Gasoline fumes, vapors, and excess liquid fuel from high levels drawn off at the float chamber through line 15 are passed into the condenser (shown in FIG. 1) where the vapors are partially condensed and the condensate returned by gravity flow to fuel tank 16. The gasoline vapors flow through vent line 15 at the fuel level of the carburetor bowl, rather than through vent 40 since line 15 is lower than line 40 and line 15 is connected to the crankcase. During the hot soak period the crankcase cools and the temperature in the carburetor bowl 30 rises, thus causing a negative pressure effect on the vapor recovery system so that gasoline vapors are drawn through lines 15, 18, and 70 to the crankcase.

The condenser 12 may be any suitably shaped receptacle such as a can with a condensate drain line 17 proximate the bottom thereof so that liquids condensing in condenser 12 may return through line 17 to the fuel tank 16. Preferably, the carburetor vent line 15 is connected to the upper portion of condenser 12. The size of the receptacle 12 should be sufficient to provide an overflow expansion chamber for the fuel tank 16 and a separator for liquid-vapor mixture received from the carburetor bowl 30 through line 15.

The gas cap 52 in the rear of the automobile is a solid non-venting cap which effectively prevents the escape of vapors from the system through the fuel fill pipe 53.

The condenser 12 is installed where it can be cooled or adjacent an area within the automobile which is relatively cool such as the passenger area of the car. At least one surface of the condenser should be in thermal communication with a cooling source so that cooling of the condenser can be effected by conduction, convection or radiation. The condenser is preferably insulated from heat sources, e.g. the engine compartment and the exhaust system area. Preferred locations for the condenser adjacent the passenger compartment are near the firewall, or over the chassis tunnel under the seat (as shown in FIG. 1) at such vertical height that vapors from the carburetor may drain by gravity to the condenser and liquids condensed in the condenser may drain from the condenser to the fuel tank by gravity flow. The condenser receptacle is preferably insulated or shielded from the heat of the engine and the exhaust system so that it is at a temperature not substantially warmer than ambient. The temperature gradient during the hot soak period will normally be on the order of about 50° F. or more between the carburetor bowl and the condenser, which is a sufficient gradient to effect some condensation of fuel vapors. Generally, the cooling sought in the condenser need only be to about 110 to 120° F. to effect this gradient. Supplemental cooling can be provided for the condenser to effect condensation, by subjecting the condenser to the cooling action of the automobile air conditioner or any suitable cooling means. In order to observe safety precautions, especially where the condenser is located in or adjacent the passenger compartment the condenser and the lines leading thereto should be protected from physical damage, for example, by suitably encasing the condenser and its lines.

Condenser receptacle 12 and its function are disclosed in more detail in co-pending application Ser. No. 715,811, filed Mar. 25, 1968, now U.S. Pat. No. 3,448,731.

The condenser 12 may be appropriately vented as through condenser vent line 18. Preferably vent line 18 connects to the upper portion of the condenser and has a relatively long vertical path so that any vapors exiting from the condenser which may subsequently condense can flow back into the condenser. As shown in FIG. 1, the condenser vent line goes up through the post 19 and along the roof of the car and through the front post 21 into a carbon trap 54 and the air cleaner 25.

As shown in FIGS. 2 and 3, the carbon trap 54 is mounted on a tubular inlet 55 which passes through an air filter 60 to the clean side of air cleaner 25. Carbon trap 54 is an open topped canister having a fine meshed screen 56 (FIG. 3) over the top for holding a block of adsorbent particles 57 therein and a side vented cover 58 to prevent water or solids from entering or blocking screen 56. A flap valve 59 is provided intermediate inlet 55 and trap 54. Valve 59 is constructed from a flexible material which normally is in a closed position as shown by the solid line of FIG. 2. When the vehicle is operating at or above the predetermined speed, however, the induction system of the engine builds up sufficient vacuum to pull flap 59 into the position shown in phantom lines. Thus during operation of the engine above a predetermined power fresh air is drawn into the carbon trap through the side vents of cover 58. This fresh air desorbs adsorbed hydrocarbons from the upper portion of the trap and passes as an air-fuel mixture into the induction system. During soak, vapors leaving condenser 12 through vent 18 pass into trap 54 and all of the hydrocarbons are adsorbed therefrom prior to entry of the vapors into the atmosphere. All other conventional vents to atmosphere in the system are closed.

The same effect of not permitting desorption until the vehicle reaches a predetermined power may also be accomplished by sizing the canister or the cover side vents so the pressure drop through the carbon trap is sufficient to prevent fresh air from passing therethrough until the vehicle induction system develops a pressure corresponding to the predetermined engine power.

A specially constructed air filter 60 of adsorbent material may be included in air cleaner 25 for adsorbing any of the hydrocarbon vapors which might be emitted to the atmosphere immediately after shutdown through the air horn (not shown) or when the system is subjected to high temperatures while the engine is not running. Such a filter is disclosed in our application Ser. No. 616,527, filed Feb. 16, 1967, now abandoned.

The adsorbing media of the carbon trap may be activated carbon, silica gel, activated alumina, titania gel, zirconia gel, molecular sieves, various naturally occurring or processed clays such as attapulgus clay, and any similar substances which have good adsorption capacity for gaseous hydrocarbons. It has been found that activated carbon type 464 produced by Barneby-Cheney, a coconut shell charcoal having a bulk density of 31 lb./cu. ft. is most satisfactory because of its high adsorption capacity. The mesh size should be suitable to minimize pressure drop across the trap without adversely affecting the adsorptive capacity. This type charcoal adsorbent has a hardness of 95 (ball abrasion test) and an as-packed moisture content of 5 percent maximum. The material used must be in a high surface area form such as granules, pellets and the like.

The adsorbent material in carbon trap 54 may be encased in a finely porous material 62, such as fine paper, which is air permeable but which does not permit the adsorbent material to pass therethrough.

When an air stream is passed over the adsorbing surfaces of the adsorbent material in carbon trap 54, desorption of some of the adsorbed hydrocarbons occurs. The system of the present invention utilizes this reversible process since, when the engine power reaches a predetermined level, air is pulled through the carbon trap by the engine's induction system. This air desorbs some of the hydrocarbons adsorbed in the trap from prior periods of tank or carburetor emissions during engine shutdown thereby conditioning the adsorbent material for adsorbing hydrocarbons during subsequent periods of soak. The desorption of hydrocarbons from the adsorbent surfaces of the carbon trap by the incoming air increases the trap life and maintains it in condition for preventing flow of hydrocarbon vapors from the system into the atmosphere.

It has been found that best results are obtained if fresh air is permitted to be passed through carbon trap 54 at the engine power developed when the vehicle is accelerating at rates above medium and when it has reached a speed of about 30–50 miles per hour and greater since, under these conditions, a relatively large flow of air and fuel is passing through the carburetor and the air-desorbed hydrocarbon flow through the carbon trap will be relatively small in comparison. For example, when the air flow through the carburetor is 200 cubic feet per minute the flow through the carbon trap may be as much as 40 cubic feet per minute without adversely affecting the air-fuel ratio in the induction system. Preferably, the amount of air passing through the carburetor should be at least 5 times that passing through the adsorbing media. This may be accomplished by sizing the carbon trap 54 or the air vents into the carbon trap or by properly weighting flap valve 59. At speeds of 30–50 m.p.h. the induction system vacuum pressure is about —0.3 to —0.5 inch of water and it increases to about —1 inch of water at 70 miles per hour. These pressures are also developed momentarily during rapid acceleration.

The flap valve may be constructed from a thin piece of hinged metal or plastic or any similar material which can be made to open when the induction system pressure is at the desired level.

The carbon trap 54, as shown in FIG. 2, may also be connected in the system at a point intermediate air cleaner 25 and flap valve 59 to a fresh air line 70 which is connected to the clean air side of air cleaner 25 and to the manifold. This type connection is more directly responsive to the manifold pressure than the clean side of the air cleaner connection. A flame arrester 72 is included in the fresh air line intermediate the manifold (not shown) and the air cleaner 25.

Alternatively, as shown in FIG. 4, carbon trap 54' may be connected to the fresh air line by means of a connecting vent 74 which includes a valve 59' mounted therein. In this embodiment of the invention a conventional air filter would be used. By properly weighting the flap valve and/or sizing the vents into carbon trap 54' clean air is not circulated through the carbon trap to desorb adsorbed hydrocarbons therefrom until the vehicle speed reaches approximately 30–50 miles per hour or the induction system pressure reaches about —0.3 to —0.5 inch of water. The carbon trap size and the valve weight can, of course, be adjusted so that clean air passes through the trap at any desired induction system pressure. For the reasons discussed it has been most desirable in our system to begin cycling of fresh air through the carbon trap at an induction system pressure of about —0.5 inch of water. Any pressure, level of delivered power, or vehicle speed for which the amount of air passing through the carburetor is sufficiently great to prevent the desorbed hydrocarbon-air mixture from adversely affecting the air fuel ratio in the engine could be used as the predetermined engine condition at which desorption should begin, however. The main objective is that the vapors passing from the carbon trap into the engine induction system comprise a mixture of air and desorbed hydrocarbons which is insufficient in quantity to affect adversely the air-fuel ratio in the engine and the hydrocarbon and carbon monoxide content of the exhaust.

Many modifications and variations of the invention, as hereinbefore set forth, may be made without departing from the spirit and scope thereof and therefore only such limitations should be imposed as are indicated in the appended claims.

We claim:

1. In an internal combustion engine powered vehicle adapted to minimize evaporative fuel losses, wherein an unvented fuel system is provided and fuel is withdrawn from a fuel tank to a carburetor which supplies an air-fuel mixture for said combustion engine, and wherein a fuel storage receptacle thermally insulated from the heat of said engine and its exhaust system is provided so that during the soak period a temperature gradient sufficient to effect partial fuel condensation in said receptacle exists between said receptacle and said carburetor, and wherein a vent line is positioned between said carburetor float chamber and said receptacle through which liquid fuel and fuel vapors can flow from said float chamber to said receptacle for separation during said engine operation and condensation during soak period, and a fuel tank vent line is provided between receptacle and said fuel tank including means through which fuel separated and said fuel condensed in receptacle may flow to said fuel tank, the improvement comprising:

adsorbing means comprising a canister containing particulated material capable of adsorbing and desorbing hydrocarbons, said canister being in fluid communication with the atmosphere, the induction system of the engine, and with said receptacle, for desorbing gaseous hydrocarbons, said adsorbing means being in fluid communication and connected with said receptacle and being connected with the induction system of said engine and said receptacle so that evaporative emissions from said fuel tank and carburetor float chamber pass through said receptacle prior to passing throgh said adsorbing means; and means connecting said adsorbing means with the induction system of said engine including valve means comprising a fluid pressure responsive valve member mounted in said connecting means intermediate said adsorbing means and the induction system of said engine, said member being normally disposed in a fluid flow blocking position and being responsive to a predetermined pressure in said induction system to move out of said flow blocking position for directing evaporative emissions from said float chamber and said fuel tank through said adsorbing means to remove hydrocarbons from said emissions and for permitting flow of fresh air in response to reduced pressure in said induction system, through said adsorbing means into the induction system of said engine for desorbing hydrocarbons from said adsorbing means only when the vacuum of said induction system is greater than a predetermined vacuum.

2. An apparatus as defined in claim 1 wherein said adsorbing means comprises a canister containing a particulate material selected from the group consisting of activated carbon, silica gel, activated alumina, titania gel, and zirconia gel.

3. An apparatus as defined in claim 1 wherein said apparatus includes an air cleaner mounted on said carburetor and said adsorbing means communicates with the clean side of said air cleaner during operation of the induction system of said engine above said predetermined vacuum so that fresh air passes through said adsorbing means to desorb adsorbed hydrocarbons therefrom and forms a mixture of air and hydrocarbons which then passes into said induction system.

4. An apparatus as defined in claim 1 wherein said system includes an air cleaner and a fresh air line connecting said air cleaner with the induction manifold of said engine and wherein said adsorbing means is in fluid communication with said fresh air line intermediate said fresh air line and said receptacle.

References Cited

UNITED STATES PATENTS

| | | | |
|---|---|---|---|
| 2,894,736 | 7/1959 | Wentworth | 123—136 |
| 3,115,114 | 12/1963 | Rapplean et al. | 123—136 |
| 3,221,724 | 12/1965 | Wentworth | 123—136 |
| 3,368,326 | 2/1968 | Hervert | 123—136 |
| 3,448,731 | 6/1969 | Daigh | 123—136 |

OTHER REFERENCES

The O.G. defensive publication Hansen, Def. Publ. of Ser. No. 775,389, filed Nov. 13, 1968, published in 861 O.G. 19 on Apr. 1, 1969.

FRANK W. LUTTER, Primary Examiner

B. NOZICK, Assistant Examiner

U.S. Cl. X.R.

55—316, 387, 510